US011089733B1

(12) United States Patent
Callahan

(10) Patent No.: US 11,089,733 B1
(45) Date of Patent: Aug. 17, 2021

(54) NET WRAP RECOVERY DEVICE

(71) Applicant: John Herman Callahan, Mulberry, AR (US)

(72) Inventor: John Herman Callahan, Mulberry, AR (US)

( * ) Notice: Subject to any disclaimer, the term of this patent is extended or adjusted under 35 U.S.C. 154(b) by 0 days.

(21) Appl. No.: 17/192,999

(22) Filed: Mar. 5, 2021

Related U.S. Application Data

(60) Provisional application No. 62/986,730, filed on Mar. 8, 2020.

(51) Int. Cl.
*A01D 87/12* (2006.01)
*B65B 69/00* (2006.01)

(52) U.S. Cl.
CPC ........ *A01D 87/127* (2013.01); *B65B 69/0025* (2013.01); *A01D 2087/128* (2013.01)

(58) Field of Classification Search
CPC ............ A01D 87/127; A01D 2087/128; A01F 29/005; A01K 5/002; E21B 31/20; E21B 31/18; B66F 9/185; B65B 69/0025; B65B 69/0008; B65H 2405/422; B62B 2202/025
See application file for complete search history.

(56) References Cited

U.S. PATENT DOCUMENTS

| | | | |
|---|---|---|---|
| 4,195,958 A | 4/1980 | Vahlkamp et al. | |
| 4,266,899 A | 5/1981 | Skeem | |
| 4,518,299 A | 5/1985 | Vanderlei | |
| 4,789,289 A | 12/1988 | Wilson | |
| 5,255,867 A | 10/1993 | Whittleton | |
| 5,318,399 A * | 6/1994 | Marom | B65B 69/00 414/412 |
| 5,911,666 A * | 6/1999 | Lancaster, III | B65B 69/00 53/492 |
| 6,332,426 B1 * | 12/2001 | van den Berg | A01D 87/127 119/51.01 |
| 8,021,095 B2 * | 9/2011 | Haugstad | A01D 87/127 414/412 |

(Continued)

FOREIGN PATENT DOCUMENTS

| | | |
|---|---|---|
| EP | 3 335 542 A1 | 6/2018 |
| EP | 3 662 740 A1 | 10/2020 |

(Continued)

OTHER PUBLICATIONS https://bushhog.com/hay_tools/3-pt-bale-unroller-cat-i-ii-hitch/ (last visited Mar. 5, 2021).

(Continued)

*Primary Examiner* — Gregory W Adams
(74) *Attorney, Agent, or Firm* — Martin S. High, P.C.

(57) ABSTRACT

A net wrap recovery device that removes net wrap from large round bales of hay attached to commercial hay bale unrollers using one or more pins. The Net Wrap Removal Device mechanically automates the unwrapping of polymeric hay bale wrapping from a wrapped hay bale in one piece quickly and with a minimum of effort. The embodiments then allow the operator to simultaneously gather and store the net wrap on a disposable spool without dismounting from the tractor seat or leaving the operator station. The disposable spool can then be easily removed from the embodiments and disposed of in a safe and environmentally friendly manner. A new spool is then quickly and easily installed in its place.

9 Claims, 8 Drawing Sheets

(56) References Cited

U.S. PATENT DOCUMENTS

2013/0149082 A1* 6/2013 Sheedy ............... A01D 87/127
              414/412
2018/0016049 A1* 1/2018 Schmitz ............. B65B 69/0033

FOREIGN PATENT DOCUMENTS

FR          2 784 855 A1    10/1998
IE          S2009/0404       3/2012
WO      WO 2015/091377       6/2015

OTHER PUBLICATIONS https://www.deere.com/en/hay-forage/handling/bu10-3-point-bale-unroller/ (last visited Mar. 5, 2021).
https://northernhydraulics.net/catalog/hay-bale-unroller/three-point-hay-bale-unroller-for-tractors-2072.html (last visited Mar. 5, 2021).
https://www.youtube.com/watch?v=wD-oNjlwkDw (last visited Mar. 5, 2021).
https://www.youtube.com/watch?v=jxQQC3qd7t0 (last visited Mar. 5, 2021).
https://hayandforage.com/article-2930-beating-those-net-wrap-blues.html (last visited Mar. 5, 2021).
https://www.youtube.com/watch?v=a6GQMpXpF2w (last visited Mar. 5, 2021).
https://www.youtube.com/watch?v=FPZPr4ul0rc (last visited Mar. 5, 2021).

* cited by examiner

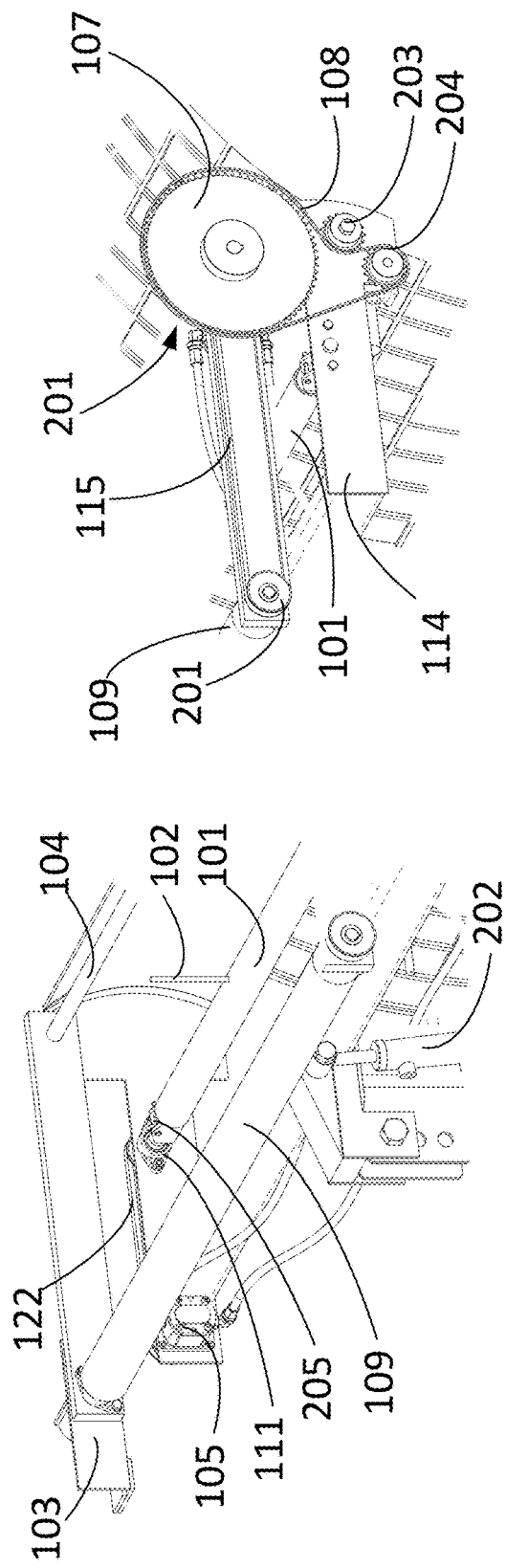
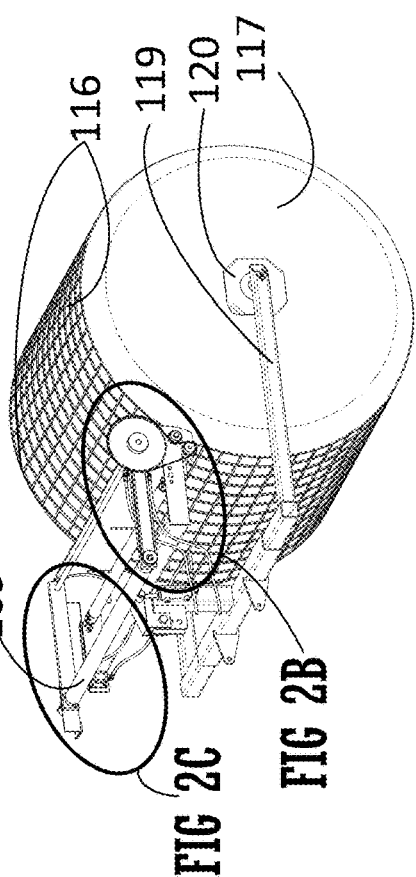
FIG 2A
FIG 2B
FIG 2C

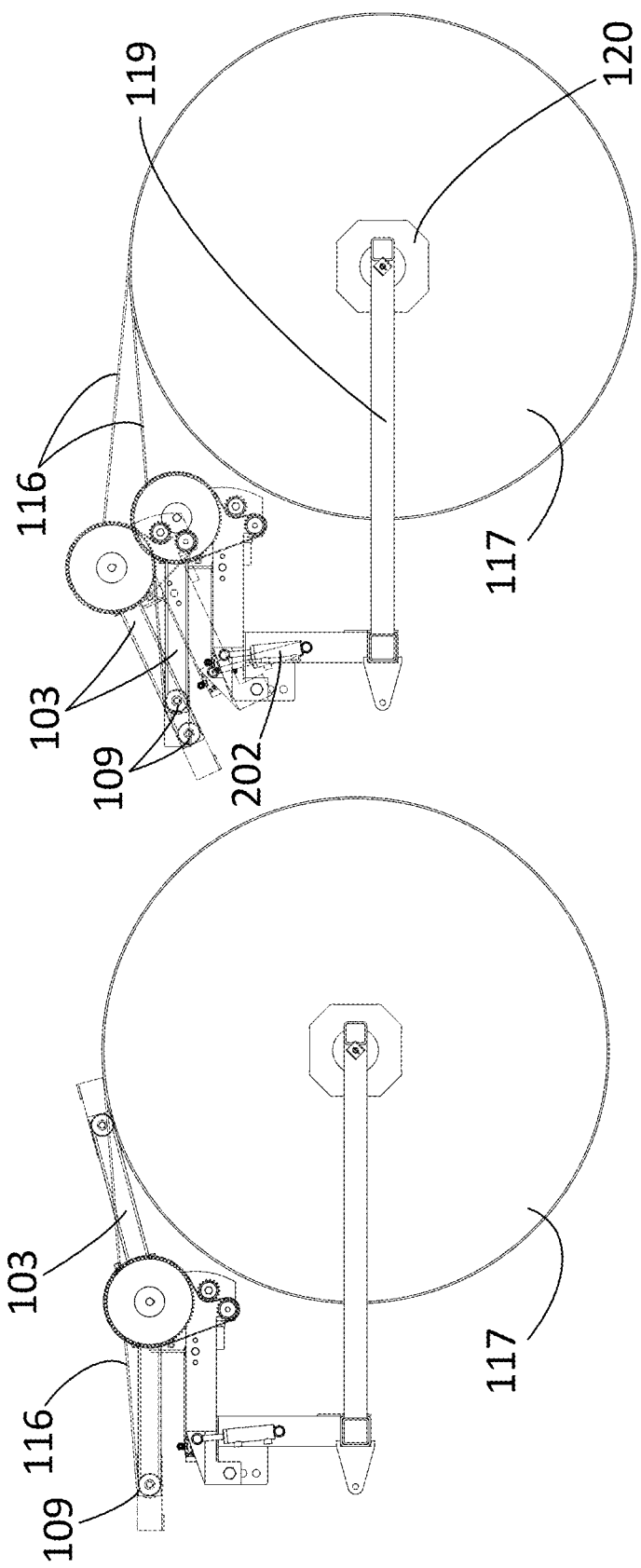

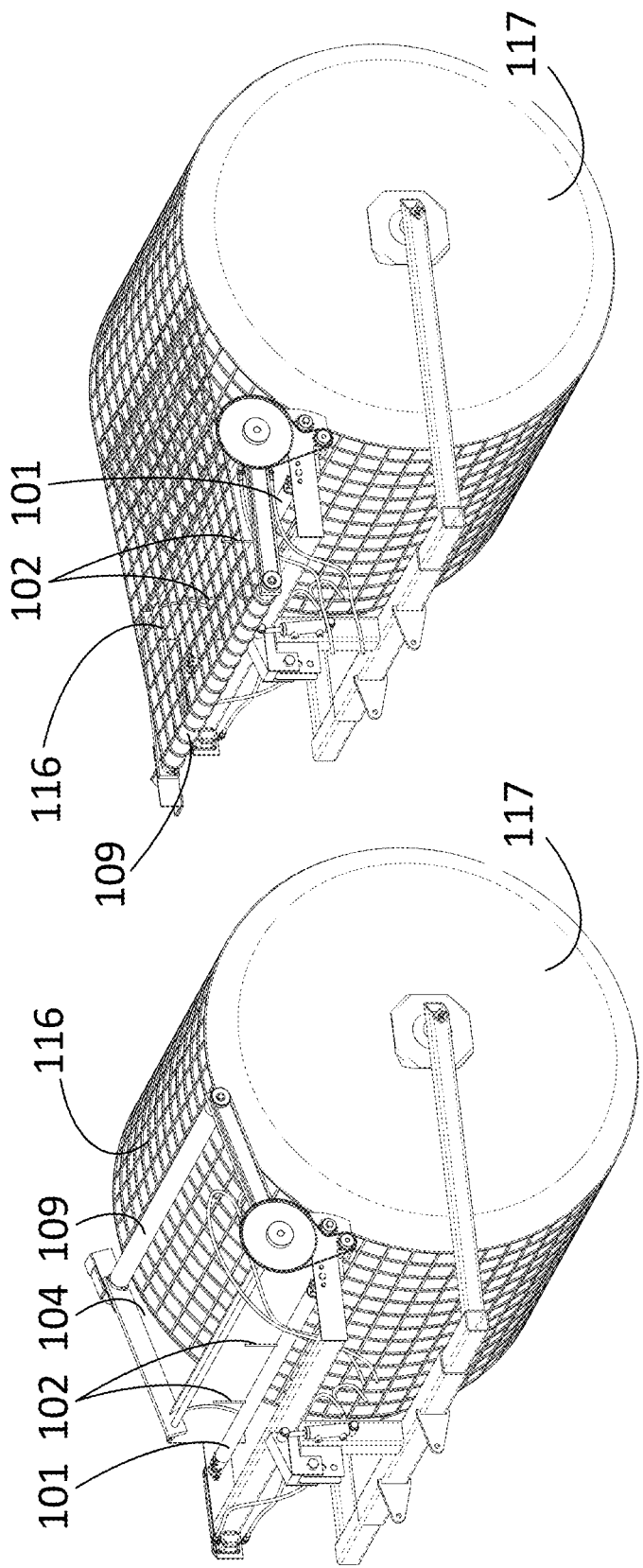

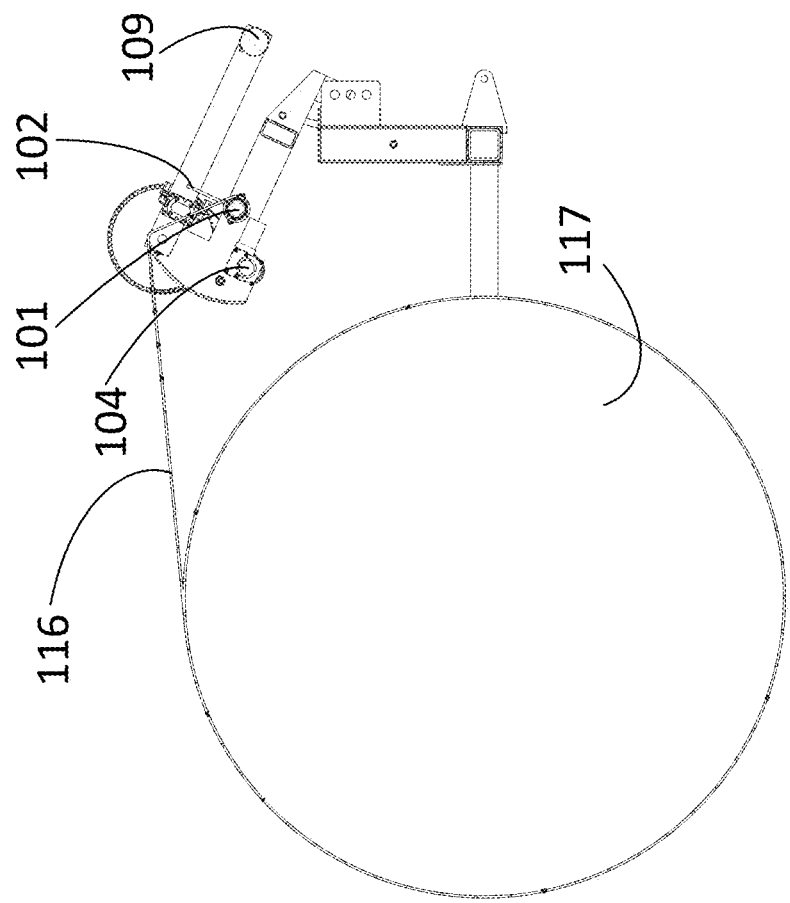
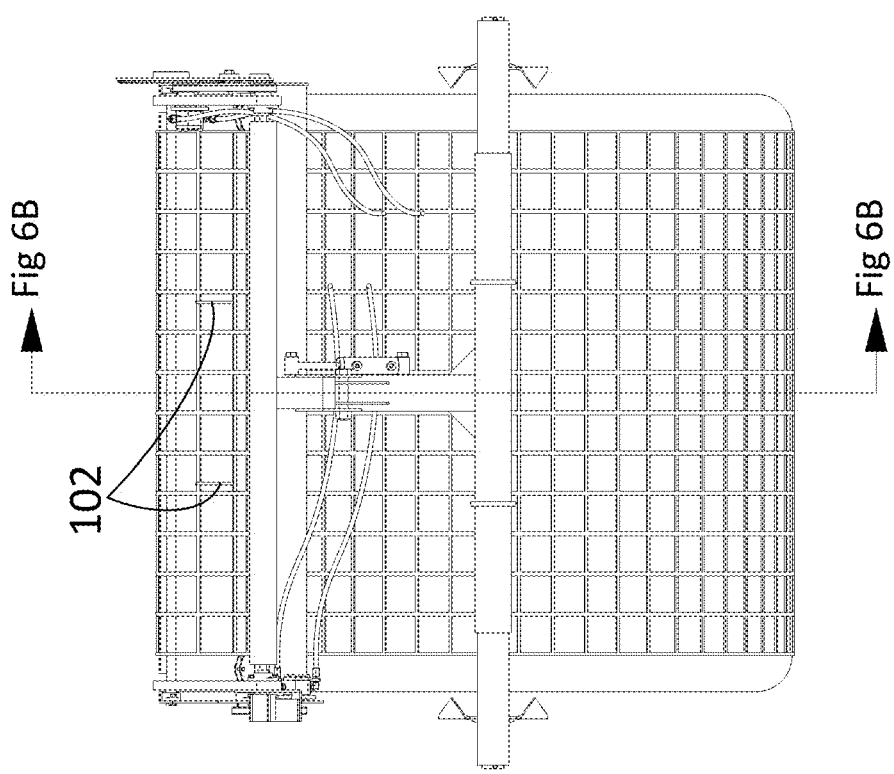
FIG 6A
FIG 6B

NET WRAP RECOVERY DEVICE

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Net Wrap Removal Device is farming. More specifically general field of the embodiments of the Net Wrap Removal Device is equipment to prepare previously round hay bales for subsequent use.

The conventional method of net wrap removal involves dismounting from the tractor and walking up to the bale with a knife, cutting the net wrap across the round bale, and attempting to pull the wrap all off the bale by dragging the wrap from around and out from under the bale using hands or hooks. This is a difficult and time-consuming task. This method can be especially challenging in bad weather conditions, such as rain and snow. Further the conventional method is dangerous, especially in weather related slippery conditions, and the danger of being crushed when the cattle that are being fed crowd around and jostle for the best food position. Additionally, the traditional method leaves the net wrap in a loose and bulky condition that makes storage difficult. Further environmental and cattle health issues arise when pieces of net wrap remain on the ground in the feeding area and become trash lying about, which is a non-digestible poison when ingested by cattle. Obviously, this poses a danger to the cattle.

SUMMARY OF THE EMBODIMENTS

The objective of the embodiments of the Net Wrap Removal Device is to mechanically automate the unwrapping of polymeric net hay bale wrapping from a previously wrapped hay bale. The embodiments are a net wrap removal device for users to remove the net wrap from large round bales of hay in one piece quickly and with a minimum of effort. The embodiments then allow the operator to simultaneously gather and store the net wrap on a disposable spool without dismounting from the tractor seat or leaving the operator station. The disposable spool can then be easily removed from the embodiments and disposed of in a safe and environmentally friendly manner. A new spool is then quickly and easily installed in its place.

There has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods, and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

BRIEF DESCRIPTION OF THE DRAWINGS

FIG. 2A is a perspective view of an embodiment of the Net Wrap Removal Device;

FIG. 2B is an exploded view of an embodiment of the Net Wrap Removal Device; FIG. 2C is an exploded view an embodiment of the Net Wrap Removal Device.

FIG. 4A is a view of an embodiment of the Net Wrap Removal Device showing the net wrap pickup roller 109 with the plurality of rubber fingers 121 (shown more clearly in FIG. 1B) engaged with net wrap 116 on a bale of hay; FIG. 4B is a side view of an embodiment of the Net Wrap Removal Device showing the net wrap pickup roller 109 in the remote position—in this remote position the net wrap 116 is engaged with the net wrap recovery spool 101 (shown more clearly in FIG. 1A) and a plurality of dowel pins 102 (shown more clearly in FIG. 1A) engaged with the net wrap 116.

FIG. 5A is a perspective view of an embodiment of the Net Wrap Removal Device showing the net wrap pickup roller 109 with the plurality of rubber fingers 121 engaged with net wrap 116 on a bale of hay; FIG. 5B is a perspective view of an embodiment of the Net Wrap Removal Device showing the net wrap pickup roller 109 in the remote position with the net wrap 116 engaged with the net wrap recovery spool 101 and the plurality of dowel pins 102 engaged with the net wrap 116.

FIG. 6A is a front view of an embodiment of the Net Wrap Removal Device; FIG. 6B is a sectional view of an embodiment of the Net Wrap Removal Device.

DETAILED DESCRIPTION OF THE PREFERRED EMBODIMENTS

Figures 1A, 1B:
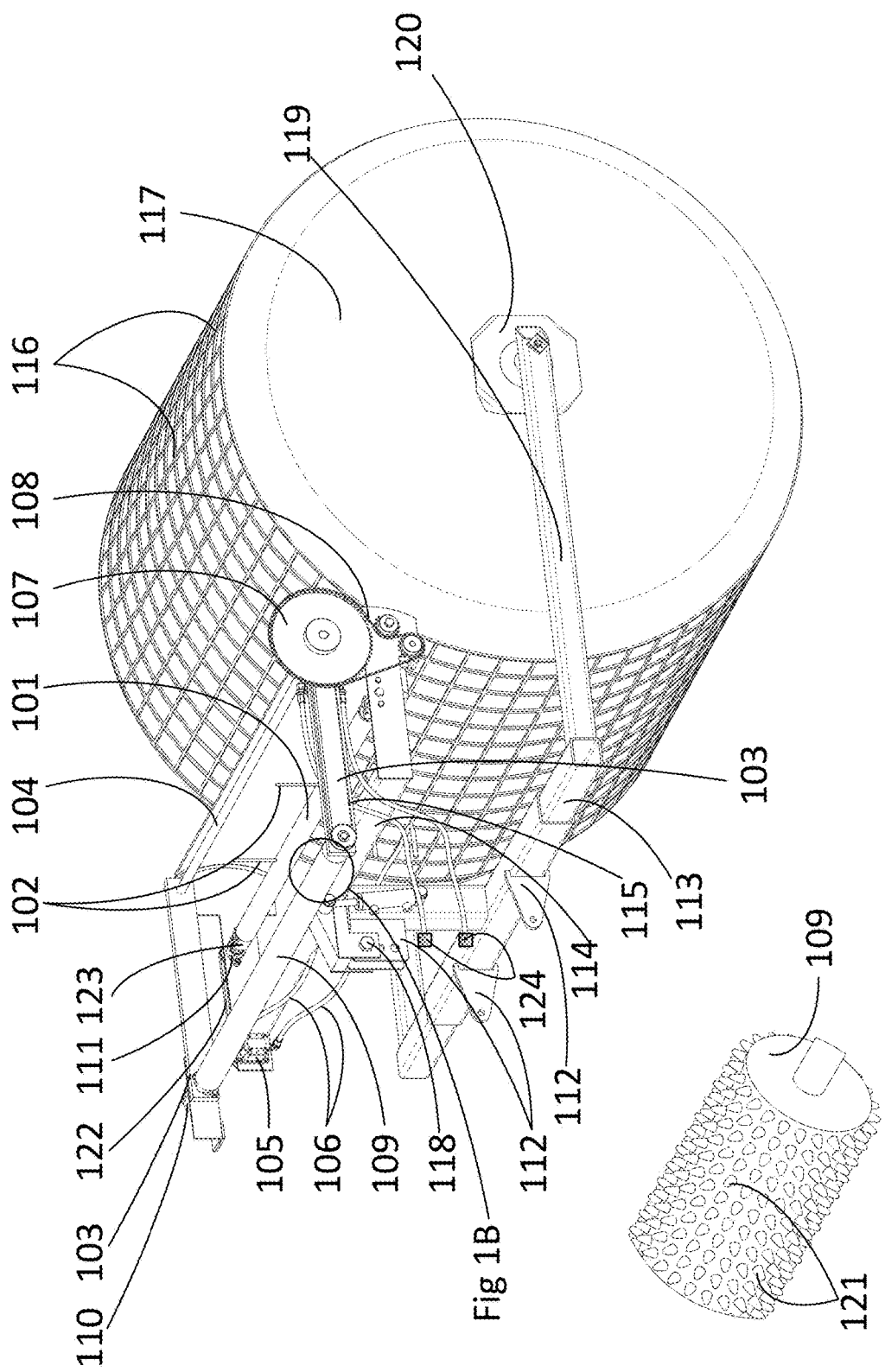
FIG. 1A is a perspective view of an embodiment of the Net Wrap Removal Device.
FIG. 1B is a perspective view of an embodiment of the Net Wrap Removal Device net wrap pickup roller showing the plurality of rubber fingers.

Embodiments of the Net Wrap Removal Device 100 are comprised of a frame 114 attached to a large hay bale unroller 113 via a mounting pin 118, a three-point mount 112, a net wrap recovery spool 101 that is held in place by a square drive 123 and end bearings 111 between the frame 114. The net wrap recovery spool 101 is powered by a hydraulic net wrap spool motor 105 (hereinafter "spool motor 105") via a spool belt 122 and the spool pulleys 302. The spool belt 122 and the spool pulleys 302 are powered by the spool motor 105. The spool motor 105 receives its hydraulic fluid via hydraulic hoses 106 which are attached to a hydraulic power source 124 such as that found on a farm tractor. Each hydraulic component is connected to its own independent power channel or valve on the hydraulic power source 124 via hydraulic hoses 106 so that each hydraulic motor or component can operate independently from each other.

Also attached to the frame 114 are a large sprocket 107 and a gear motor 303. The gear motor 303 turns the large sprocket 107 an idler gear 203 and a drive gear 204 via a chain 108 which results in a keyed shaft 104 rotating and moving the pivoting arms 103 forward or backward around the keyed shaft 104. The pivoting arms 103 are located on both sides of the Net Wrap Removal Device and serve to support and rotate the net wrap pickup roller 109 around the keyed shaft 104.

A net wrap pickup roller 109 is attached to the distal ends of the pivoting arms 103. The net wrap pickup roller 109 is powered by a net wrap pickup roller hydraulic motor 301 (hereinafter "pickup motor 301"), net wrap pickup pulleys 201, and the pickup roll drive belt 115. The pickup motor 301 gets its fluid power via hydraulic hoses 106.

Figure 3C:
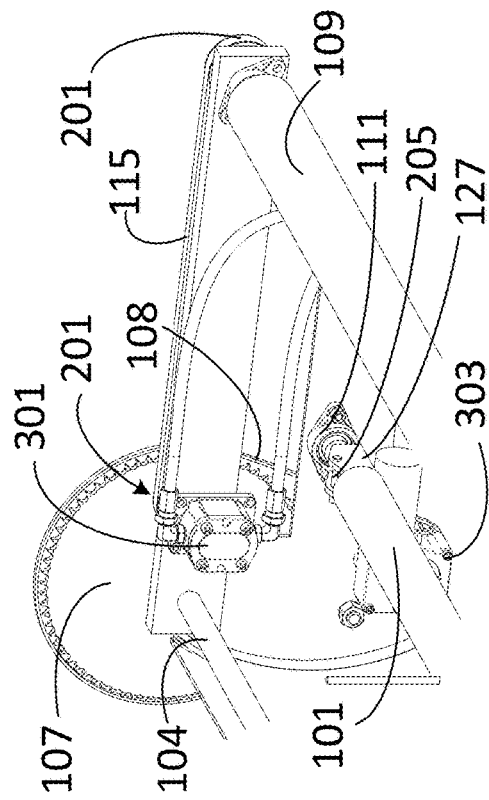
FIG. 3C is an exploded view of an embodiment of the Net Wrap Removal Device.
Figure 3B:
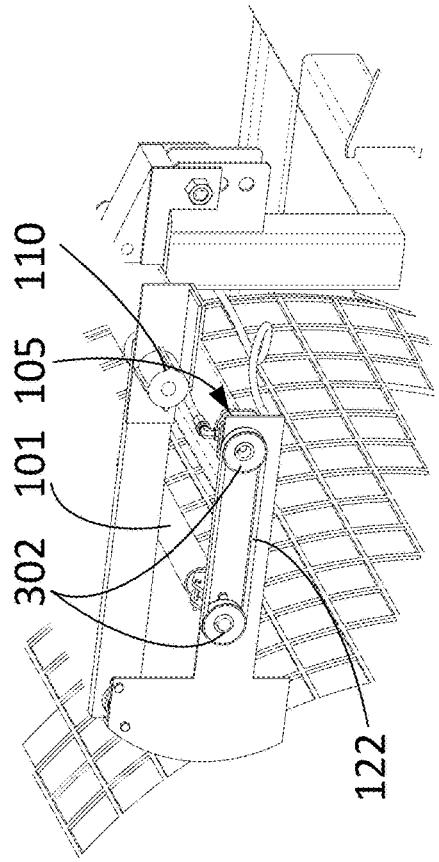
FIG. 3B is an exploded view of an embodiment of the Net Wrap Removal Device.
Figure 3A:
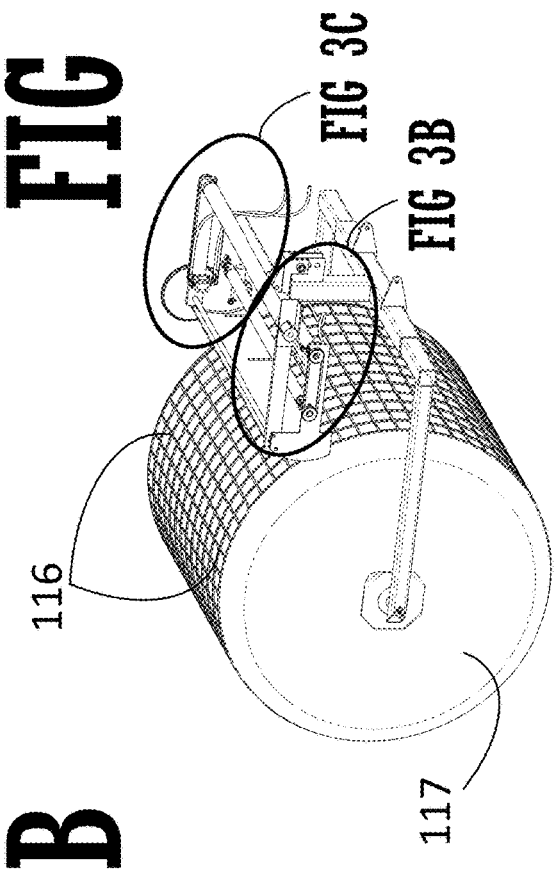
FIG. 3A is a perspective view of an embodiment of the Net Wrap Removal Device.
Figure 7:
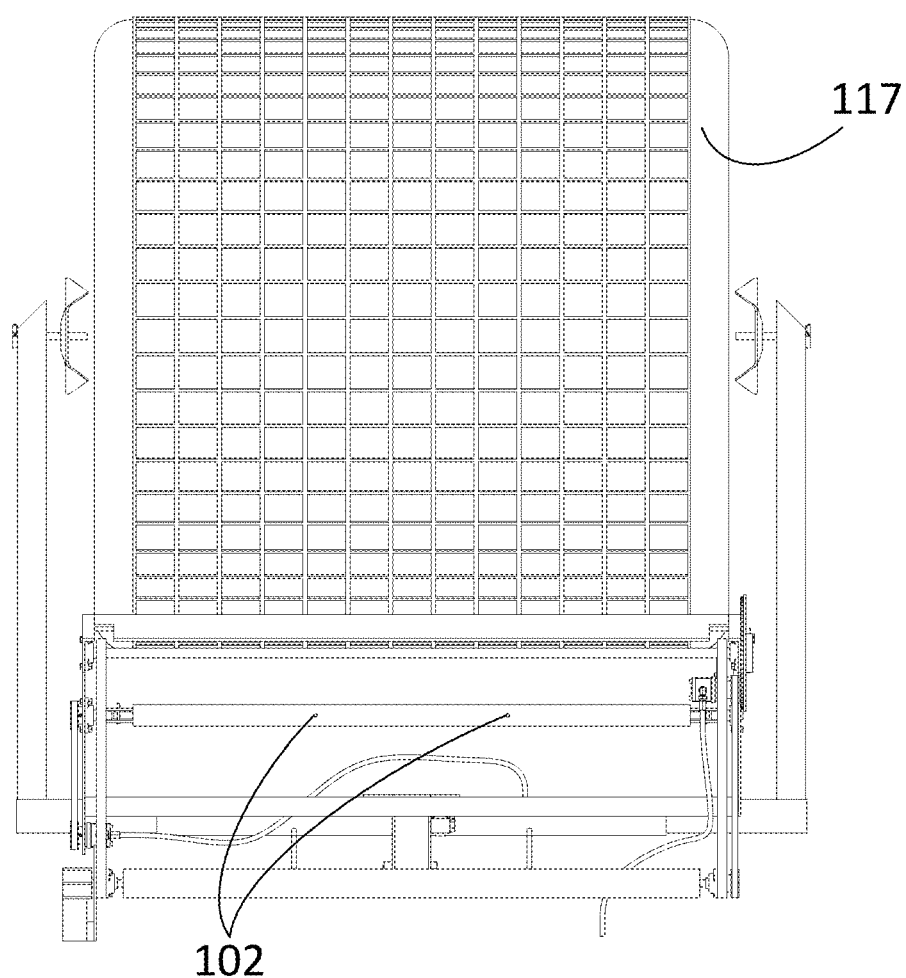
FIG. 7 is a top view of an embodiment of the Net Wrap Removal Device.
Figure 8:
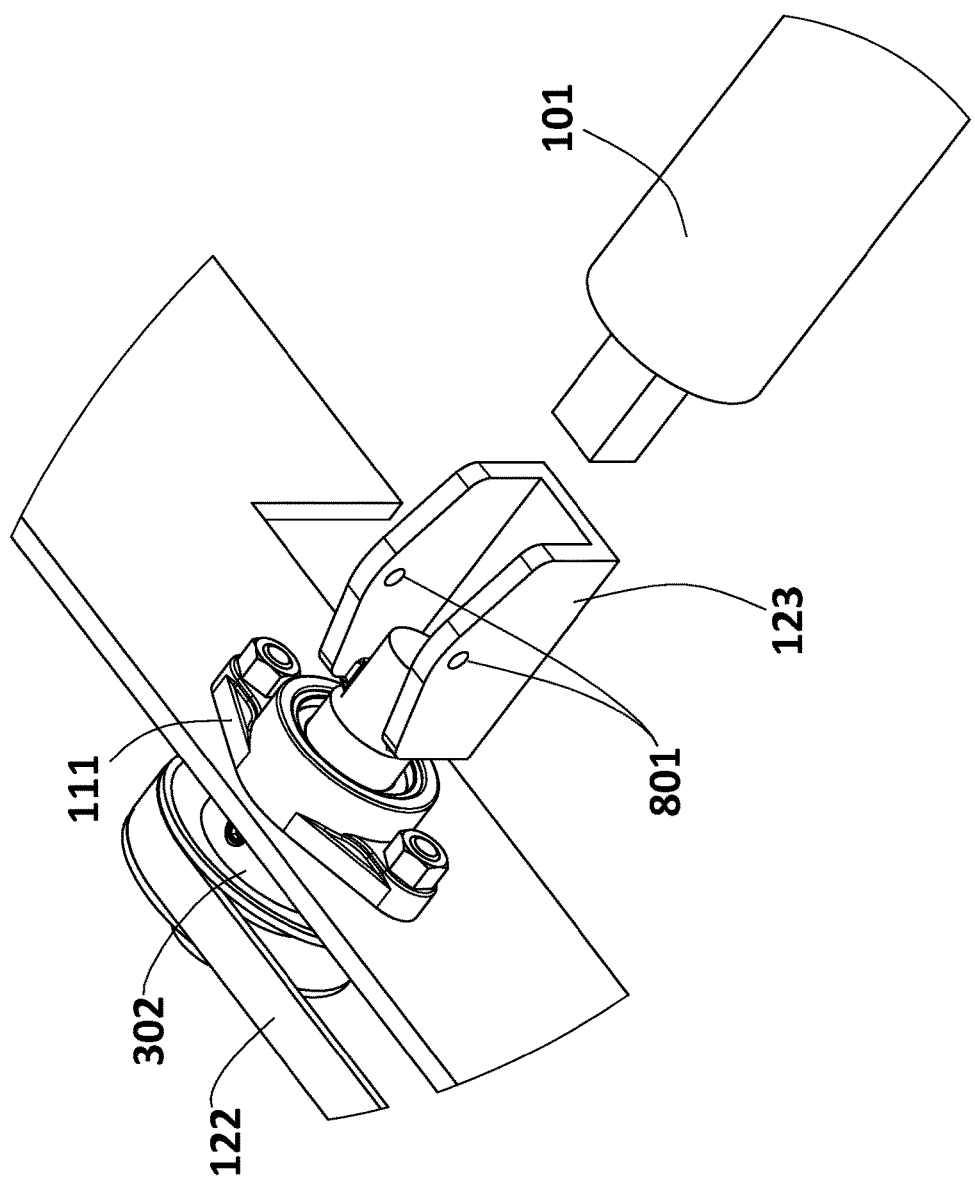
FIG. 8 is a top view of an embodiment of the Net Wrap Removal Device showing the placement of the square drive 123.

When the gear motor 303 is engaged in reverse, the keyed shaft 104 and the pivoting arms 103 rotate counterclockwise (as viewed from the perspective in FIG. 3C) around the key shaft 104 and net wrap pickup roller 109 moves toward the hay bale 117 until it touches the loose end of the net wrap 116 on the hay bale 117. The pickup motor 301 is engaged and turns the net wrap pickup roller 109 in a counterclockwise direction (as viewed from the perspective of FIG. 2C) collecting the loose end of net wrap 116. Disengaging the pickup motor 301 will automatically engage the brake 110 keeping net wrap pickup roller 109 from rolling clockwise. This will hold net wrap 116 in place. Then gear motor 303 is engaged in the forward direction powering the large sprocket 107, the idler gear 203, and a drive gear 204, the chain 108, the keyed shaft 104, the pivoting arms 103, and net wrap pickup roller 109. The net wrap 116 is moved all the way in the clockwise position (as viewed from the perspective of FIG. 3C) and engages the net wrap 116 over the plurality of dowel pins 102 and the net wrap recovery spool 101. The plurality of dowel pins 102 are positioned along the length of the spool 101 to grab and engage the net wrap 116. The brake 110 is automatically disengaged allowing the net wrap 116 to be pulled from net wrap pickup roller 109 by engaging the spool motor 105 in a counterclockwise direction. The spool motor 105 rotates the net wrap recovery spool 101 in the counterclockwise direction (as viewed from the right). The plurality of dowel pins 102 catch the net wrap 116 stalling the spool motor 105, thus diverting the hydraulic oil to the lift cylinder 202, lifting the entire device 100, up and away from hay bale 117 as shown in FIG. 4B. When lift cylinder 202 is fully extended the oil is forced back to the spool motor 105 then recovery net wrap recovery spool 101 continues to turn in a counterclockwise direction simultaneously pulling net wrap 116 from net wrap pickup roller 109 while wrapping and storing net wrap 116 onto net wrap recovery spool 101. The hay bale 117 is moved forward until all the net wrap 116 is recovered and stored onto the net wrap recovery spool 101. The process is repeated until the net wrap recovery spool 101 is completely full. Then the retainer pins 205 are removed from the retainer pin apertures 801 formed by the square drive. The plurality of dowel pins 102 are removed allowing the net wrap recovery spool 101 to be lifted out and the net wrap 116 slides off the net wrap recovery spool 101. In one embodiment the net wrap recovery spool 101 is constructed of cardboard or polymeric materials such as PVC and can be disposed along with the net wrap 116. In another embodiment, the net wrap recovery spool 101 is manufactured from steel and can be reused.

The frame 114 can be manufactured with metal, including flat plate, angular, tubular, or a combination of aluminum, iron, or steel. Further, 12-volt electric motors could be used in place of the spool motor 105 and the pickup motor 301. PVC pipe, heavy cardboard tube, or any other manner of material with a cylindrical shape could be used as spool 101. Note that the various components of the net wrap recovery device could be made from different materials.

The embodiments will fit on most commercial large hay bale unrollers. Further, the embodiments can be easily attached and removed using one or more pin. Further the embodiments save time and are safer than previous methods. Further this device keeps the net wrap in one piece, not allowing small pieces that remain in the field to be ingested by animals. Further the embodiments allow used net wrap to be disposed of properly and easily.

The best mode of operation of the embodiments of the Net Wrap Recovery Device are as follows: Using a tractor, the commercial large hay bale unroller 113 is backed into a round bale 117. The bale support 119 and the bale spinner 120 are hydraulically actuated to grab the round bale 117. The net pickup roll 109 is driven by a gear motor 303 actuated to come in contact with the net wrap 116 on the round bale 117 as shown in FIGS. 4A and 5A. The gear motor 303 is any rotary motor including an electric motor or hydraulic motor. The plurality of rubber fingers 121 on the net pickup rolls 109 grab the net wrap 116 as shown in FIG. 4B. Then the net wrap pickup roller 109 is hydraulically positioned away from the hay bale 117 in the remote position as shown in FIG. 5B.

Once the net wrap pickup roller 109 is in the remote position as shown in FIG. 5B, the net rap is engaged with the net wrap recovery spool 101 and the plurality of dowel pins 102. The plurality of dowel pins 102 grab the net wrap 116. The net wrap recovery spool 101 is hydraulically engaged and spins so that the plurality of dowel pins 102 wrap the net wrap 116 around the net wrap recovery spool 101. As the tractor is engaged to roll out the round bale 117, and the round bale 117 spins, the net wrap recovery spool 101 takes up the net wrap 116.

The Net Wrap Removal Device has been described as comprising a spool 101 motor 105, pickup motor 301, a gear motor 303 as hydraulic motors, that is, motor that receive their energy for activation from a hydraulic system. In another embodiment, these motors can be connected directly to the end of the spool shaft or pickup spool shaft via flexible couplers, instead of belts and pulleys. In another embodiment, the gear motor 303 is an 12V electric motor.

The Net Wrap Removal Device has been described as being mounted on a farm tractor. However, the Net Wrap Removal Device can be mounted on any vehicle with any power source. The vehicle could be any vehicle used in the agricultural industry including pickup trucks. The power source could be any power sources used in the agricultural industry including a hydraulic power source 124, a rotating power source, or an electric power source.

What I claimed is:

1. A net wrap removal device comprising a frame [114] attached to a large bale hay unroller [113] via a mounting pin [118], a three-point mount [112], a net wrap recovery storage spool [101], and a net wrap pickup roller [109] with a plurality of rubber fingers [121].

2. A net wrap removal device described in claim 1 wherein the net wrap recovery storage spool [101] is held in place by a square drive [123] and retainer pins [205] which are inserted through retainer pin apertures [801] formed by the square drive [123].

3. A net wrap removal device described in claim 2 wherein the net wrap recovery storage spool [101] is removable by removing the retainer pin apertures [801] and a plurality of dowel pins [102] positioned along the length of the spool [101].

4. A net wrap removal device described in claim 2 comprising wherein the net wrap recovery storage spool [101] is powered by a hydraulic spool motor [105] via a spool belt [122] and spool pulleys [302].

5. A net wrap removal device described in claim 1 wherein the net wrap pickup roller [109] is powered is powered by a pickup motor [301] via a pickup roll drive belt [115] and net wrap pickup pulleys [201] wherein the pickup motor [301] receives its hydraulic fluid power via hydraulic hoses [106] from a power source [124].

6. A net wrap removal device described in claim 2 wherein a large sprocket [107] and a gear motor [303] are attached to the frame [114], wherein the gear motor [303] turns the large sprocket [107] via a chain [108] which results in a keyed shaft [104] rotating and moving the pivoting arms [103] forward or backward around the keyed shaft [104].

7. A net wrap removal device described in claim 3 wherein the net wrap pickup roller [109] is attached to the distal end of a plurality of pivoting arms [103] and the net wrap pickup roller [109] is powered by a pickup motor [301], wherein the pickup motor [301] is provided fluid power from hydraulic hoses [106].

8. A net wrap removal device described in claim 1 wherein sprockets [107] and a gear motor [303] are attached to the frame [114], wherein the gear motor [303] turn the sprockets [107] via a chain [108] which results in a keyed shaft [104] rotating and moving a plurality of pivoting arms [103] forward or backward around the keyed shaft [104].

9. A net wrap removal device described in claim 1 wherein the net wrap pickup roller [109] is attached to the distal end of a plurality of pivoting arms [103] and the net wrap pickup roller [109] is powered by a pickup motor [301], wherein the pickup motor [301] is provided fluid power from hydraulic hoses [106].

\* \* \* \* \*